US011820090B2

(12) United States Patent
Caccami et al.

(10) Patent No.: US 11,820,090 B2
(45) Date of Patent: Nov. 21, 2023

(54) METHOD AND SYSTEM FOR READING/WRITING DATA FROM/ON RFID TAGS INTEGRATED/APPLIED IN/ON TIRES CONVEYED ON CONVEYOR BELTS

(71) Applicant: Bridgestone Europe NV/SA [BE/BE], Zaventem (BE)

(72) Inventors: Maria Cristina Caccami, Rome (IT); Cecilia Occhiuzzi, Rome (IT); Sara Amendola, Rome (IT); Gaetano Marrocco, Rome (IT); Nicola D'Uva, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 346 days.

(21) Appl. No.: 17/297,798

(22) PCT Filed: Dec. 11, 2019

(86) PCT No.: PCT/EP2019/084705
§ 371 (c)(1),
(2) Date: May 27, 2021

(87) PCT Pub. No.: WO2020/126757
PCT Pub. Date: Jun. 25, 2020

(65) Prior Publication Data
US 2022/0048264 A1 Feb. 17, 2022

(30) Foreign Application Priority Data

Dec. 18, 2018 (IT) .................. 102018000020134

(51) Int. Cl.
*H04Q 5/22* (2006.01)
*B29D 30/00* (2006.01)
(Continued)

(52) U.S. Cl.
CPC ..... *B29D 30/0016* (2013.01); *G06K 7/10217* (2013.01); *B29D 2030/0027* (2013.01); *B60C 19/00* (2013.01)

(58) Field of Classification Search
CPC ........ B29D 30/0016; B29D 2030/0027; G06K 7/10217; B60C 19/00
See application file for complete search history.

(56) References Cited

U.S. PATENT DOCUMENTS 5,266,785 A * 11/1993 Sugihara .............. G07B 15/063
235/382
5,884,754 A * 3/1999 Fromm .................. B65G 39/16
198/806
(Continued)

FOREIGN PATENT DOCUMENTS

DE  202017102186 U1  6/2017
WO    2016095922 A1  6/2016
WO    2018189258 A1  10/2018

OTHER PUBLICATIONS

Caccami et al., Method and system for reading RFID tags embedded into tires on conveyors (Year: 2019).*
(Continued)

*Primary Examiner* — Quang Pham
(74) *Attorney, Agent, or Firm* — Patterson Intellectual Property Law, PC

(57) ABSTRACT

A system and method is provided for reading and/or writing data from/on RFID tags of tires conveyed on a conveyor belt in a conveyance direction, wherein each tire is fitted with a respective RFID tag storing a univocal identifier of said tire. An antenna is installed over or nearby the conveyor belt and configured to radiate RF signals toward a footprint area on the conveyor belt and receive backscattered RF signals from said footprint area. A reader is connected to the antenna to operate the latter in transmission and reception. A prelimi-
(Continued)

nary calibration step is applied to the reader and a reading and/or writing step is carried out by operating the calibrated reader.

11 Claims, 5 Drawing Sheets

(51) Int. Cl.
*G06K 7/10* (2006.01)
*B60C 19/00* (2006.01)

(56) References Cited

U.S. PATENT DOCUMENTS

| | | | | |
|---|---|---|---|---|
| 5,929,760 A * | 7/1999 | Monahan | ............ | G06K 7/10425 343/866 |
| 6,028,518 A * | 2/2000 | Rankin | ............... | G08B 13/2471 340/5.86 |
| 6,114,961 A * | 9/2000 | Denholm | ............ | G08B 13/2411 340/676 |
| 6,218,942 B1 * | 4/2001 | Vega | .................. | G06K 19/0723 340/676 |
| 6,714,121 B1 * | 3/2004 | Moore | ............... | G08B 13/2462 340/8.1 |
| 6,943,688 B2 * | 9/2005 | Chung | ............... | G08B 13/2462 343/893 |
| 7,084,768 B2 * | 8/2006 | Hartmann | .......... | G06K 7/10029 340/10.2 |
| 7,088,248 B2 * | 8/2006 | Forster | .................... | H04K 3/43 340/10.2 |
| 7,183,922 B2 * | 2/2007 | Mendolia | ............. | H01Q 9/0407 340/572.1 |
| 7,187,288 B2 * | 3/2007 | Mendolia | ............ | G06K 7/10336 340/572.1 |
| 7,195,159 B2 * | 3/2007 | Sloan | ....................... | B64F 1/368 235/375 |
| 7,218,231 B2 * | 5/2007 | Higham | ............... | G06Q 10/087 340/572.1 |
| 7,227,469 B2 * | 6/2007 | Varner | ............... | G08B 13/2462 340/676 |
| 7,710,275 B2 * | 5/2010 | Phillips | ................ | G06Q 10/087 340/572.7 |
| 8,256,607 B2 * | 9/2012 | Wallace | .................. | B65G 15/36 198/810.02 |
| 8,446,256 B2 * | 5/2013 | Pinkham | ............ | G06K 7/10356 340/10.3 |
| 8,593,283 B2 * | 11/2013 | Smith | ...................... | H04B 5/02 235/375 |
| 8,854,212 B2 * | 10/2014 | Goidas | ................... | H01Q 21/08 343/866 |
| 8,890,657 B2 * | 11/2014 | Lin | .......................... | G06F 3/012 340/572.1 |
| 9,183,717 B1 * | 11/2015 | Diorio | ................ | G08B 13/2474 |
| 9,409,716 B2 * | 8/2016 | Bastian, II | ............. | B65G 43/08 |
| 9,760,826 B1 * | 9/2017 | Stine | .................. | G06K 7/10079 |
| 9,830,486 B2 * | 11/2017 | Roth | .................... | H01Q 17/00 |
| 9,922,218 B2 * | 3/2018 | Roth | .................. | G06K 7/10435 |
| 10,062,025 B2 * | 8/2018 | Roesner | ............. | G06K 19/0723 |
| 10,117,080 B2 * | 10/2018 | Wilkinson | ........... | H04B 5/0031 |
| 10,331,923 B2 * | 6/2019 | Roth | .................. | G06K 7/10435 |
| 10,372,951 B2 * | 8/2019 | Forster | ............... | G06K 7/10445 |
| 10,432,239 B2 * | 10/2019 | Peitz | ....................... | H05B 47/19 |
| 10,565,410 B1 * | 2/2020 | Shmulevich | ........ | G06K 7/10356 |
| 11,544,484 B2 * | 1/2023 | St-Jean | ............... | G06K 7/10445 |
| 2003/0075416 A1 * | 4/2003 | Prutu | .................... | G01G 19/005 198/370.1 |
| 2004/0070503 A1 * | 4/2004 | Monahan | ............. | H01Q 1/2216 340/572.7 |
| 2004/0213177 A1 * | 10/2004 | Moritani | ............... | H04L 45/851 370/328 |
| 2006/0022826 A1 * | 2/2006 | Higham | ............... | G06Q 10/087 340/572.1 |
| 2006/0176152 A1 * | 8/2006 | Wagner | ................ | G06K 7/0008 340/10.2 |
| 2006/0226989 A1 * | 10/2006 | Hillegass | ............. | H01Q 1/2241 340/572.7 |
| 2006/0232423 A1 * | 10/2006 | Cox | ...................... | H01Q 1/2241 340/572.7 |
| 2007/0075866 A1 * | 4/2007 | Hohler | ............... | G06K 7/10435 340/572.1 |
| 2007/0194921 A1 * | 8/2007 | Watanabe | .............. | G06K 17/00 340/572.1 |
| 2008/0007410 A1 * | 1/2008 | Rosenbaum | ....... | G06K 7/10079 340/572.1 |
| 2008/0117055 A1 * | 5/2008 | Blake | .................. | G06K 7/10435 340/572.7 |
| 2008/0265031 A1 * | 10/2008 | Liu | ....................... | G01R 31/311 235/437 |
| 2012/0187194 A1 * | 7/2012 | Svetal | ...................... | G07G 1/01 235/470 |
| 2012/0205448 A1 * | 8/2012 | Hoskinson | ........... | G06K 7/1098 235/440 |
| 2012/0212327 A1 * | 8/2012 | Torabi | ................ | G06K 7/10099 340/10.1 |
| 2013/0078385 A1 * | 3/2013 | Hendricks, Sr. | ........ | B05B 16/60 118/712 |
| 2013/0148143 A1 * | 6/2013 | Ooyanagi | .......... | H04N 1/00015 358/1.14 |
| 2013/0175339 A1 * | 7/2013 | Svetal | ...................... | G07G 1/14 235/383 |
| 2014/0027511 A1 * | 1/2014 | Plocher | .................... | G06K 7/10 235/439 |
| 2016/0321481 A1 * | 11/2016 | Bottazzi | ................. | G06K 17/00 |
| 2017/0223810 A1 * | 8/2017 | Bernsen | .................. | F21V 33/00 |
| 2017/0259376 A1 * | 9/2017 | Beransky | ........... | B23K 26/0838 |
| 2018/0004992 A1 * | 1/2018 | Jacobsen | ................ | B65G 43/08 |
| 2018/0157873 A1 * | 6/2018 | Roth | ................... | G06K 7/10366 |
| 2018/0157879 A1 * | 6/2018 | Forster | ............... | G06K 7/10445 |
| 2018/0219624 A1 * | 8/2018 | Tsang | .................. | H04B 10/1149 |
| 2018/0333964 A1 * | 11/2018 | Sawamura | ............... | B41J 2/475 |
| 2019/0283181 A1 * | 9/2019 | Beransky | ........... | B23K 37/0235 |
| 2020/0309890 A1 * | 10/2020 | Aliakseyeu | ............ | H05B 47/19 |

OTHER PUBLICATIONS

Rao et al., Antenna design for UHF RFID tags A review and a practical application (Year: 2006).*

International Searching Authority: International Search Report for corresponding International Patent Application No. PCT/EP2019/084705 dated Jan. 23, 2020, 3 pages.

Intellectual Property India: Examination report issued in corresponding India Patent Application No. 202117029644 dated Jul. 18, 2022.

* cited by examiner

METHOD AND SYSTEM FOR READING/WRITING DATA FROM/ON RFID TAGS INTEGRATED/APPLIED IN/ON TIRES CONVEYED ON CONVEYOR BELTS

TECHNICAL FIELD OF THE INVENTION

The present invention relates to a method and a system for reading and/or writing data from/on radiofrequency identification (RFID) tags integrated/embedded in, or applied on/to, tires conveyed on conveyor belts.

STATE OF THE ART

In tire sector, it is felt the need for solutions enabling automated and univocal identification of tires during manufacturing, use and disposal thereof.

For example, with specific reference to tire manufacture, automated and univocal identification of tires may allow optimizing manufacturing processes and logistics operations, boosting the use of automated control systems, performing an efficient tire tracking/tracing and, hence, realizing smart tire factories.

In this context, the use of barcodes applied to tires to manage tire production and production history of individual tires is known. However, this solution has its limitations since printed barcodes run the risk of being deleted or corrupted during manufacturing and/or normal operation of tires, thereby becoming illegible or, anyway, difficult to read.

In order to solve such limitations, US 2016/0092814 A1 proposes using a tire identification system based on radiofrequency identification (RFID) tags. In particular, US 2016/0092814 A1 discloses a tire production management system using RFID tags, whose operation includes: attaching an RFID tag to a tire before producing a finished tire in tire manufacturing processes; recognizing the tire tag attached to the tire in each of manufacturing processes; and thus managing information according to a manufacturing process on an individual tire. The tire production management system according to US 2016/0092814 A1 comprises: an RFID tag attachment part; a plurality of RFID readers; a plurality of management terminals for respective processes; a lot management server; and a tire production management server. US 2016/0092814 A1 also describes code recognition of an RFID tag attached to a tire conveyed on a conveyor belt, wherein the code recognition is performed by an RFID reader adjacent to said conveyor belt.

Moreover, Italian patent application No. 102016000009727 discloses a configurable and tunable radiofrequency wireless sensor device that may be advantageously integrated/incorporated into, or applied to, a tire to provide automatic identification of the tire during its manufacturing, during logistics operations and also during its normal operation. Additionally, the configurable and tunable radiofrequency wireless sensor device according to 102016000009727 may be conveniently configured to provide also diagnostic data, such as temperature or pressure data.

WO2016095922 discloses a method of handling and processing tyres in a tyre production facility. The method includes positioning an uncured tyre in a support and moving the support with the tire in a conveyor system.

DE202017102186 discloses a pneumatic tire with an inner surface defining a cavity and an outer surface facing away from the inner surface; the tyre comprising a radio chip having an antenna, wherein the radio chip is adapted to operate with electromagnetic waves and wherein the electromagnetic waves have a wavelength; wherein the antenna over its entire length is at a distance to the outer surface, which is on average less than $1/10$ of the wavelength and/or smaller than 25 mm.

EP1792685 discloses a method and apparatus for identifying 3-D coordinates of a target region on a tire including: taking a digital image of a tire; finding an edge of a tire bead using pixel brightness values from the tire image; calculating tire bead circle center and radius using a plurality of image pixels on the tire bead edge; and performing a pixel brightness search around the bead circumference using the bead circle's center and radius to identify the target area X, Y coordinates. The Z-coordinate and slope of the target area are determined from multiple point distance calculations across the region.

OBJECT AND SUMMARY OF THE INVENTION

The Applicant has carried out an in-depth study in order to develop an improved methodology and system for reading and/or writing data from/on RFID tags integrated/embedded in, or applied on/to, tires conveyed on conveyor belts, thereby conceiving the present invention.

Thence, an object of the prevent invention is that of providing a methodology and a system of the above type providing, in general, excellent RFID-based reading/writing performance and, in particular, univocal detection of RFID tags with enhanced performance with respect to that of currently known solutions.

This object is achieved by the present invention in that it relates to a method and a system for reading and/or writing data from/on radiofrequency identification (RFID) tags of tires conveyed on a conveyor belt, as defined in the appended claims.

More specifically, the present invention concerns a method for reading and/or writing data from/on RFID tags of tires conveyed on a conveyor belt in a conveyance direction, wherein each tire is fitted with a respective RFID tag storing a univocal identifier of said tire. Said method comprises providing:
  an antenna installed over or nearby the conveyor belt and configured to
    radiate radiofrequency (RF) signals toward a footprint area on the conveyor belt, and
    receive backscattered RF signals from said footprint area; and
  a reader connected to the antenna to operate the latter in transmission and reception.

The method comprises also carrying out a preliminary calibration step including calibrating the reader by:
  a1) placing a given tire fitted with a given RFID tag on the conveyor belt and keeping said given tire immobile under/nearby the antenna;
  a2) while the given tire is kept immobile under/nearby the antenna,
    determining a minimum transmission power necessary to activate the given RFID tag,
    determining a calibration transmission power higher than said minimum transmission power, and
    radiating, via the antenna, calibration RF signals with said calibration transmission power and receiving, via said antenna, backscattered calibration RF signals from the given RFID tag;
  a3) while continuing radiating the calibration RF signals and receiving the backscattered calibration RF signals, increasingly moving the given tire back and forth on the conveyor belt until the given RFID tag stops responding;

a4) estimating a size of the footprint area parallelly to the conveyance direction based on the operation a3);

a5) measuring first received power levels of the calibration RF signals received by the given RFID tag while the given tire is kept immobile under/nearby the antenna and while said given tire is moved back and forth, and second received power levels of the backscattered calibration RF signals received by the reader via the antenna while the given tire is kept immobile under/nearby the antenna and while said given tire is moved back and forth;

a6) repeating the operations a1)-a5) with different tires, thereby obtaining a plurality of calibration transmission powers related to the different tires, a plurality of estimated sizes of the footprint area related to the different tires, and a plurality of first and second received power levels related to the different tires; and a7) computing an average transmission power based on the calibration transmission powers obtained, an average size of the footprint area based on the estimated sizes obtained, an interrogation rate based on the average size of the footprint area and a given conveyance speed of the conveyor belt, average received power levels based on the first and second received power levels obtained, and one or more thresholds based on the average received power levels.

Moreover, the method further comprises carrying out a reading and/or writing step that includes operating the calibrated reader to:

b1) radiate, via the antenna, one or more interrogation RF signal(s) with the average transmission power and with the interrogation rate computed in the preliminary calibration step;

b2) receive, via the antenna, one or more backscattered interrogation RF signal(s) from a RF tag of a tire passing through the footprint area, wherein said backscattered interrogation RF signal(s) carries/carry the univocal identifier of the passing tire;

b3) measuring one or more third received power level(s) of the interrogation RF signal(s) received by the RFID tag of the passing tire, and one or more fourth received power level(s) of the backscattered interrogation RF signal(s) received by the reader via the antenna;

b4) detect the passing tire by comparing the third and fourth received power levels with the threshold(s) computed in the preliminary calibration step; and b5) identify the detected passing tire based on the univocal identifier carried by the backscattered interrogation RF signal(s).

Conveniently, the reading and/or writing step includes operating the calibrated reader also to:

b6) reading and/or writing tire-related data from/to the RFID tag of the passing tire.

Preferably, the antenna is configured to have a radiation pattern such that to result in the footprint area covering:

a whole width of the conveyor belt perpendicularly to the conveyance direction; and a limited length parallelly to said conveyance direction.

Conveniently, the antenna is planar and parallel to the conveyor belt, and has a predefined length parallelly to the conveyance direction and a predefined width perpendicularly to said conveyance direction, wherein the predefined length is larger than the predefined width.

Preferably, the first, second, third and fourth received power levels are indicative of received power amplitude and phase measurements.

Additionally, the present invention concerns also a system for reading and/or writing data from/on RFID tags of tires conveyed on a conveyor belt in a conveyance direction, wherein each tire is fitted with a respective RFID tag storing a univocal identifier of said tire. Said system comprises:

an antenna installed over or nearby the conveyor belt and configured to radiate RF signals toward a footprint area on the conveyor belt, and receive backscattered RF signals from said footprint area; and a reader that is connected to the antenna to operate the latter in transmission and reception, and is designed to undergo the preliminary calibration step and, once calibrated, is operable to carry out the reading and/or writing step of the aforesaid method according to the present invention.

Preferably, the system comprises a plurality of antennas that are:

installed in different positions along the conveyor belt;

configured, each, to radiate RF signals toward, and receive backscattered RF signals from, a respective footprint area on the conveyor belt; and connected to the reader to be operated in transmission and reception;

wherein a position of each detected tire is determined, by the reader or by an electronic control unit connected thereto or integrated/embedded therein, based on the antenna (conveniently, based on the position of the antenna) that has received the backscattered interrogation RF signal(s) based on which said tire has been detected.

BRIEF DESCRIPTION OF THE DRAWINGS

For a better understanding of the present invention, preferred embodiments, which are intended purely by way of non-limiting examples, will now be described with reference to the attached drawings (all not to scale), where.

DETAILED DESCRIPTION OF PREFERRED EMBODIMENTS OF THE INVENTION

The following discussion is presented to enable a person skilled in the art to make and use the invention. Various modifications to the embodiments shown and described will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention concerns the use of one or more RFID reading and/or writing systems (hereinafter called RFID gate(s)) installed along the path of a conveyor belt to monitor tires conveyed on said conveyor belt and fitted, each, with a respective RFID tag storing tire-related data including a univocal identifier of the tire and, conveniently, also additional information (e.g., information items indicating tire model, date and/or place of production, tire materials, etc.).

The present invention is advantageously exploitable for automatic control, monitoring and tracking applications in (smart) tire manufacturing, sorting and disposal plants employing conveyor belts. In fact, by using the present invention, it is possible to deploy RFID gates along the paths of the conveyor belts to control/monitor/track tires moving on said conveyor belts, wherein the RFID gates, in use, read the tire-related data stored on the RFID tags of passing tires and, if required, may conveniently also write (i.e., store) data thereon (for example, the univocal identifiers and/or, as previously explained, also additional information).

In particular, in use, an RFID gate according to the present invention has the capability to univocally and singularly identify each passing tire, avoiding the problem of multiple reads from adjacent tires/conveyors. This allows to automatically perform specific actions on each single passing tire and to univocally track/monitor the sequence of passing tires.

Figure 1:
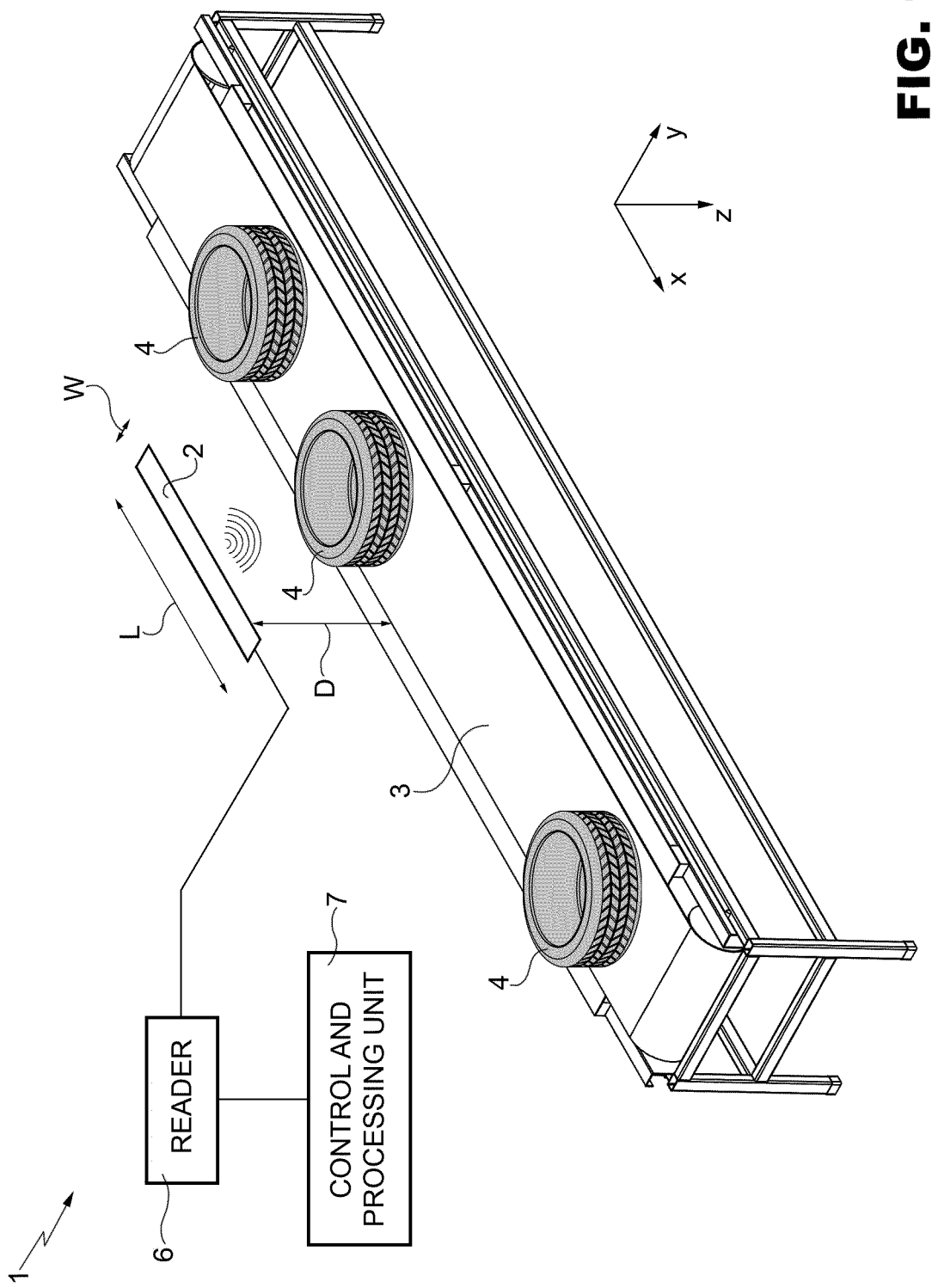
FIG. 1 schematically illustrates an RFID gate according to a preferred (albeit non-limiting) embodiment of the present invention.

For a better understanding of the present invention, FIG. 1 schematically illustrates an RFID gate (denoted as a whole by 1) according to a preferred (albeit non-limiting) embodiment of the present invention.

In particular, the RFID gate 1 includes an antenna 2 (conveniently, an array antenna) arranged over a conveyor belt 3 conveying tires 4 along (i.e., parallelly to) a given direction of conveyance, wherein each tire 4 is fitted with a respective RFID tag (not shown in FIG. 1) storing (at least) a univocal identifier of said tire 4.

The antenna 2 is substantially planar and parallel to both the conveyor belt 3 and a reference plane xy defined by:
  a first reference direction x parallel to the given direction of conveyance of the tires 4 on the conveyor belt 3; and
  a second reference direction y perpendicular to the first reference direction x (and, hence, also orthogonal to said given direction of conveyance).

The antenna 2 has a predefined length L along (i.e., parallelly to) the first reference direction x and a predefined width W along (i.e., parallelly to) the second reference direction y, wherein the predefined length L is larger than the predefined width W (i.e., L>W)

The antenna 2 is spaced apart from the conveyor belt 3, along (i.e., parallelly to) a third reference direction z orthogonal to the first and second reference directions x and y, by a predefined distance D.

Preferably, in order to facilitate detection of passing tires 4, the antenna 2 is a directional antenna configured to radiate and receive radiofrequency (RF) signals to/from a footprint area covering:
  a whole width of the conveyor belt 3 along (i.e., parallelly to) the second reference direction y; and
  a limited length along (i.e., parallelly to) the first reference direction x.

Conveniently, the antenna 2 is a directional antenna configured to have a blade-shaped radiation pattern, which is oriented orthogonally to the given direction of conveyance of the tires 4 on the conveyor belt 3 (i.e., perpendicularly to the first reference direction x and parallelly to the second reference direction y) and that has a main lobe covering the whole width of the conveyor belt 3 along the second reference direction y and a limited length along the first reference direction x.

Figure 2:
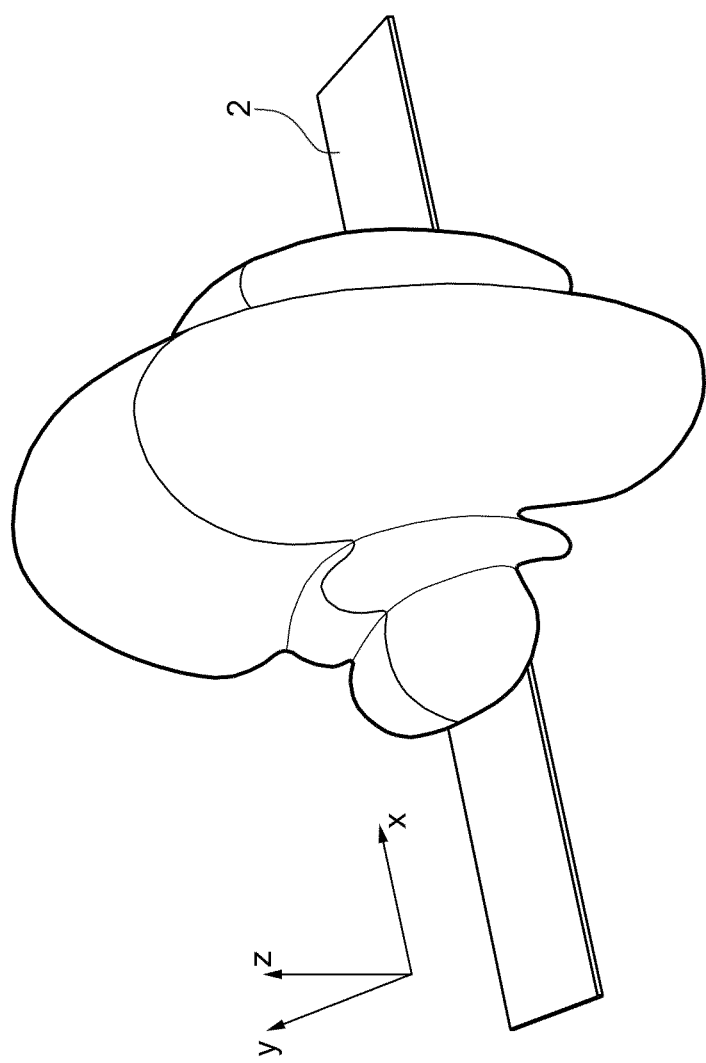
FIGS. 2, 3 and 4 show an example of radiation pattern of an antenna of the RFID gate of FIG. 1.
Figure 3:
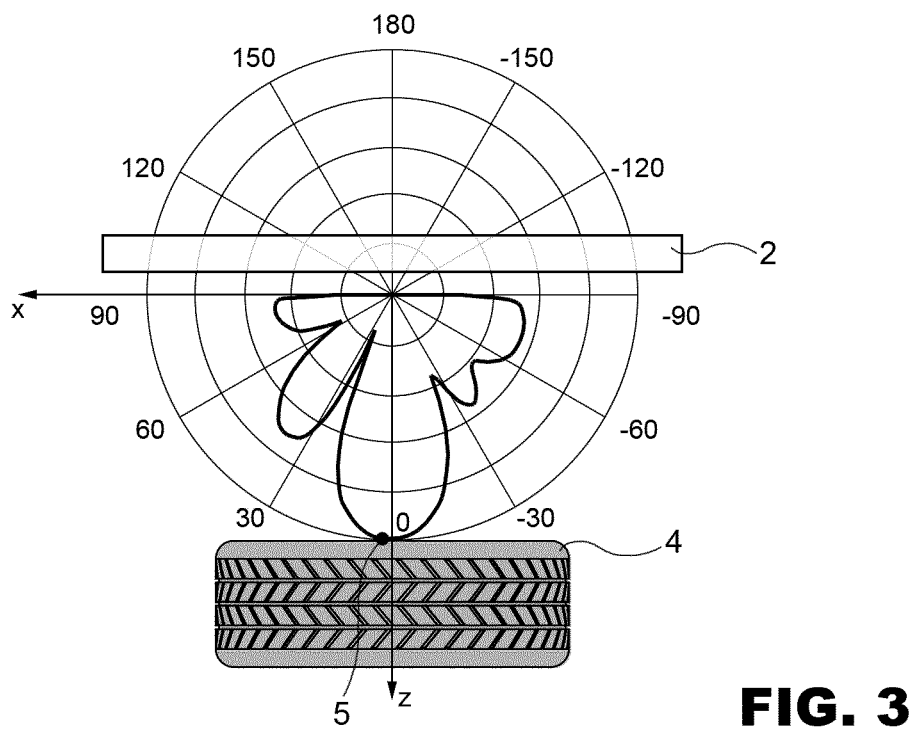
Figure 4:
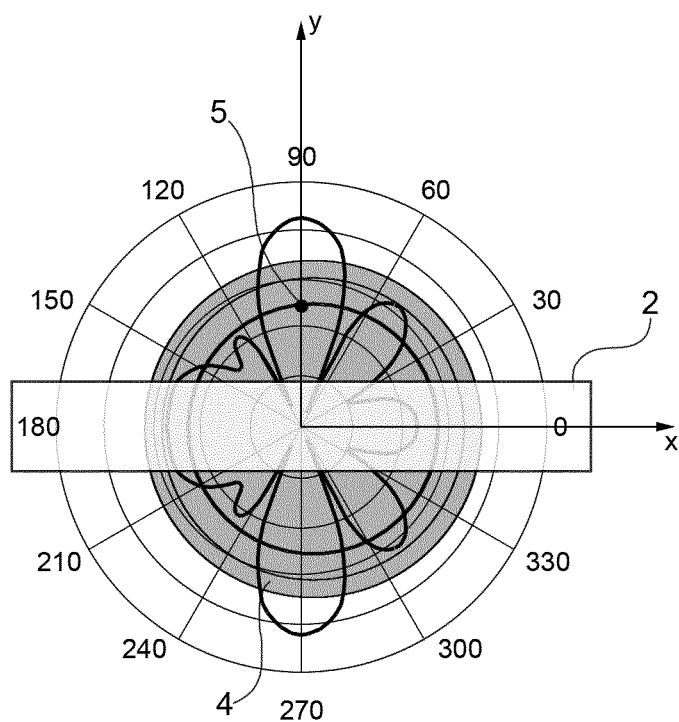

In this connection, FIGS. 2, 3 and 4 show an example of radiation pattern for the antenna 2 in, respectively, reference space xyz, reference plane xz, and reference plane xy (in FIGS. 3 and 4, reference numeral 5 denoting an RFID tag applied on the tire 4 shown).

Conveniently, the antenna 2 is operable to radiate/receive RF signals having frequencies in Ultra High Frequency (UHF) band, preferably in 860-960 MHz frequency range, more preferably in 865-868 MHz frequency sub-range and/or 902-928 MHz frequency sub-range.

Additionally, optional requirements for the antenna 2 may conveniently include:
  gain higher than 0 dB;
  operation based on circular polarization;
  beam width lower than 90° at least on a single plane.

Again with reference to FIG. 1, the RFID gate 1 further includes a reading and/or writing unit/device 6 (hereinafter simply called reader, for the sake of concision) connected to the antenna 2 in a wired fashion, for example by means of a coaxial cable. Moreover, a control and processing unit 7 (e.g., a computer) is locally or remotely connected to the reader 6 to control operation thereof. In this connection, it is worth noting that the control and processing unit 7 could be also conveniently integrated/embedded in the reader 6.

Conveniently, the reader 6 may be connected to a plurality of antennas 2 installed in different positions along the path of the conveyor belt 3. For example, the reader 6 might be conveniently connected to up to four antennas 2 directly or through a multiplexer (e.g., time/power division strategies could be conveniently adopted for feeding the different antennas 2).

Additionally, optional requirements for the reader 6 may conveniently include:
  support for the whole 860-960 MHz frequency range, or for the aforesaid frequency sub-ranges;
  capability to support multiple antenna connections and to operate up to a level of +31.5 dBm;
  capability to operate with separate read and write levels and power command-adjustable, for example from 5 dBm to 31.5 dBm with at least +/−0.5 dBm accuracy.

In view of the foregoing, in use, when the tires 4 are conveyed on the conveyor belt 3, the RFID gate 1 is able to univocally detect and automatically identify each tire 4 passing under the antenna 2. Thence, a control/monitoring system employing a plurality of RFID gates 1 (and/or a plurality of antennas 2 connected to one or more readers 6) installed along the path of the conveyor belt 3 (or along the paths of a plurality of conveyor belts 3) is able to exactly locate each moving tire 4.

Furthermore, by conveniently using a proper processing of the transmitted and received RF signals (in amplitude, phase and time), it is possible also to monitor/track the sequence of tires 4 passing the/each RFID gate 1 (or, in case of multiple antennas 2 connected to one or more readers 6, the sequence of tires 4 passing under each antenna 2).

Moreover, the/each reader 6 may be conveniently configured to:

- read, in addition to tires' univocal identifiers, also additional tire-related data stored on the RFID tags 5 of the passing tires 4 (e.g., information items indicating tire model, date and/or place of production, tire materials, etc.); and,
- if required, also write (i.e., store) data on the RFID tags 5 of the passing tires 4.

In this connection, it is worth noting that, as it is clear, the/each reader 6 may be conveniently used to write also the univocal identifiers on the RFID tags 5.

The reading and/or writing operations may be conveniently controlled by:

- the control and processing unit 7 connected to all the readers 6 employed, wherein said control and processing unit 7 is configured (in particular, is programmed) to selectively control each reader 6 to perform one or more respective predefined reading and/or writing operations; or
- a central control unit remotely connected to all the control and processing units 7 employed, wherein said central control unit is configured (in particular, is programmed) to selectively control each control and processing unit 7 so as to cause the latter to selectively control each reader 6 connected thereto to perform one or more respective predefined reading and/or writing operations.

More in general, a method for reading and/or writing data from/on RFID tags 5 of tires 4 conveyed on a conveyor belt 3 according to a preferred embodiment of the present invention includes:

- a preliminary calibration step including calibrating the reader 6, wherein said preliminary calibration step is conveniently performed once the RFID gate 1 has been installed or if the surrounding environment undergoes substantial alterations that may affect RF communication scenario (e.g., alterations to positions of scattering objects); and
- a reading and/or writing step carried out by operating the calibrated reader 6.

Hereinafter a preferred (albeit non-limiting) embodiment of said method will be described in detail with specific reference to the RFID gate 1, namely in the case of one single antenna 2, one single reader 6 and one single control and processing unit 7, remaining clear that the following teachings may be applied, mutatis mutandis, to different system architectures involving the use of one or more control and processing units 7, each connected to one or more readers 6, each connected to one or more antennas 2 (which can conveniently have also a different spatial arrangement with respect to the conveyor belt, e.g., can be arranged adjacent/close to an edge thereof).

Preferably, RFID tag detection is based on a combined use of power amplitude and phase of the RF signals transmitted by the reader 6 via the antenna 2 to an RFID tag 5 and backscattered from the latter to the antenna 2 and, hence, received by the reader 6.

Conveniently, some preliminary operations may be common to both the preliminary calibration step and the reading and/or writing step, such as:

- connecting the reader 6 to the control and processing unit 7 by selecting a proper communication port/interface (e.g., Ethernet, Serial, USB, Wifi, etc.);
- selecting a reader 6 (if multiple readers 6 are employed) and switching on the antenna 2 thereof (or an antenna 2 thereof, if a plurality of antennas 2 are connected to the/each reader 6);
- defining specific interrogation modalities in terms of operating frequency, interrogation rate (i.e., number of interrogations per second (or per other time unit)) and power emitted.

Conveniently, at the beginning of a reader-to-tag communication, the reader 6 activates a RFID tag 5 passing under the antenna 2 by sending a continuous wave. Then, the activated RFID tag 5 receives commands from the reader 6 and, finally, sends back data (i.e., the univocal identifier and/or the additional tire-related data) through a backscattered modulation of the continuous wave received from the RFID gate 1. The backscattered and transmitted powers are measured in terms of received signal strength indicators (RSSIs) at reader side ($RSSI_R$, in amplitude and phase) and at RFID tag side ($RSSI_T$, in amplitude and phase).

For a better understanding of the preliminary calibration step, hereinafter a preferred (albeit non-limiting) embodiment thereof will be described in detail.

Figure 5:
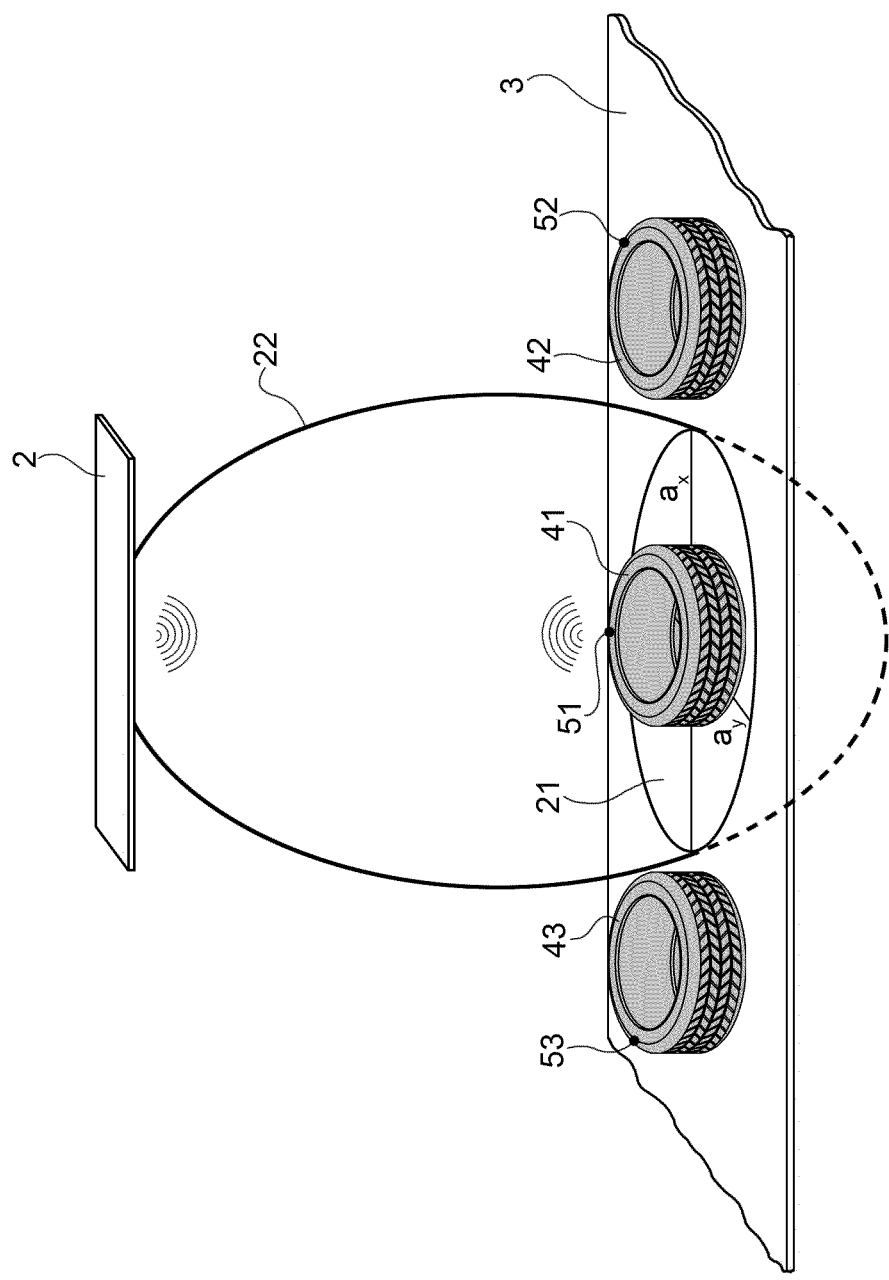
FIG. 5 schematically illustrates an example of scenario for performing a preliminary calibration of the RFID gate of FIG. 1.

In this connection, FIG. 5 schematically illustrates an example of scenario for performing the preliminary calibration of the reader 6.

In particular, as shown in FIG. 5, a tire 41 fitted with an RFID tag 51 is conveniently placed on the conveyor belt 3 right under the antenna 2, and a minimum power ($P_{min}$) to be emitted by the reader 6 via the antenna 2 to activate the RFID tag 51 is conveniently determined (preferably, by implementing a turn-on power measurement procedure).

Then, a transmission power value $P_{TX}=P_{min}+P_{sm}$—where $P_{sm}$ denotes a safety margin (e.g., equal to 3 dB)—is conveniently set to ensure a rather robust communication between the reader 6 and the RFID tag 51 regardless of the position of the RFID tag 51 in/on the tire 41 (polar orientation).

Said transmission power $P_{TX}$ is, then, used to transmit RF signals from the antenna 2, while RSSI values are measured at both RFID tag and reader sides ($RSSI_T$, $RSSI_R$), in both amplitude/module and phase.

Then, a size of a footprint area 21 of the antenna 2 on the conveyor belt 3 (i.e., the area wherein there is maximum likelihood that the RFID tag 51 is detected) can be experimentally determined by increasingly moving the tire 41 back and forth (manually or by operating the conveyor belt 3) from its initial position until the RFID tag 51 stops responding. In this connection, it is worth noting that the footprint area's size typically depends on the specific configuration used (i.e., transmission power $P_{TX}$, antenna beam width, conveyor belt type, etc.).

In order to reduce multiple responses from RFID tags 51, 52, 53 of adjacent tires 41, 42, 43, it may be convenient to properly space out the adjacent tires 41, 42, 43 on the conveyor belt 3 so as to have only one tire 41/42/43 at a time within the determined footprint area 21 (e.g., by approximately assuming an ellipsoid-shaped read volume 22, the minimum distance $d_{min}$ between adjacent tires 41, 42, 43 may be conveniently assumed greater than a semi-major axis $a_x/2$ of the footprint area 21 parallel to the direction of conveyance of the tires 41, 42, 43 on the conveyor belt 3).

For additional information about RFID footprint, reference can be made, for example, to G. Casati et al., "*The Interrogation Footprint of RFID-UAV: Electromagnetic Modeling and Experimentations*", IEEE Journal of Radio Frequency Identification, Volume 1, Issue 2, pages 155-162, 25 Oct. 2017.

Conveniently, in order to take account of the variability of setup, the above procedure is repeated N times (e.g., at least three times) with different tires 41, 42, 43 to determine an average transmission power value $P_{TX\text{-}av}$, average RSSI values $RSSI_{T\text{-}av}$, $RSSI_{R\text{-}av}$ (amplitude and phase) and an average size of the footprint area 21.

Therefore, at the end of the preliminary calibration step, the transmission power value to be used for carrying out the reading and/or writing step is set equal to $P_{TX\text{-}av}$, whereas the average RSSI values $RSSI_{T\text{-}av}$, $RSSI_{R\text{-}av}$ are used to set one or more thresholds to be used to detect passing tires and to discriminate between/among multiple reads (e.g., due to tires not spaced enough, multiple tires on adjacent conveyor belts, stochastic multipath phenomena, etc.).

Different threshold computation choices may be conveniently adopted based on the average RSSI values $RSSI_{T\text{-}av}$, $RSSI_{R\text{-}av}$ and depending on various factors, such as the specific configuration used (i.e., transmission power $P_{TX}$, antenna beam width, conveyor belt type, etc.). For example, it is possible to compute:
- one single overall threshold to be used with all the RSSI measurements; or
- an amplitude threshold for all the RSSI amplitude measurements and/or a phase threshold for all the RSSI phase measurements; or, even,
- four thresholds, namely a first amplitude threshold and a first phase threshold for, respectively, the RSSI amplitude and phase measurements performed at RFID tag side, and a second amplitude threshold and a second phase threshold for, respectively, the RSSI amplitude and phase measurements at reader side.

The final choice about threshold computation for a particular configuration/installation may be conveniently made based on assessments performed during the preliminary calibration step carried out for such a particular configuration/installation.

Moreover, in the preliminary calibration step it is possible to determine also an interrogation rate to be used to detect passing tires. In fact, being $a_x$ the determined average size of the footprint area along the direction of conveyance of the tires on the conveyor belt (e.g., the major axis of the elliptical footprint area 21 shown in FIG. 5) and $v_x$ the speed of the conveyed tires (which can be reasonably considered constant), it is possible to determine a time $t_x$ necessary for a tire to cover the whole footprint area, or equivalently the time in which a tire is within the footprint area. Thence, an interrogation rate to be used by the reader 6 to detect passing tires may be conveniently determined so as to have at least one interrogation within the time $t_x$.

Additionally, for a better understanding of the reading and/or writing step, a preferred (albeit non-limiting) embodiment of tire detection operations performed in said reading and/or writing step will be described in detail in the following.

Conveniently, during normal operation, the reader 6 continuously transmits "read" commands via the antenna 2 by using, as transmission power value, the average transmission power value $P_{TX\text{-}av}$ determined in the preliminary calibration step, wherein $P_{TX\text{-}av}$ is such to allow reading only one single RFID tag passing under the antenna.

Moreover, the thresholds computed based on the average step are used to detect RFID tags passing under the antenna 2 and to discriminate between/among multiple reads (which, as previously explained, could be due to an insufficient spacing of adjacent tires on one and the same conveyor belt, or the presence of multiple tires on adjacent conveyor belts, or stochastic multipath phenomena, etc.).

Conveniently, the detection of an RFID tag may be synthetically expressed in the following way:
- if $RSSI_{R/T\text{-}m} \geq RSSI_{th}$, then an RFID tag (and, hence, a tire) is detected, or,
- if $RSSI_{R/T\text{-}m} < RSSI_{th}$, then an RFID tag/tire is not detected (e.g., it could be before/after the antenna 2 on the same conveyor belt 3, or on an adjacent conveyor belt), wherein $RSSI_{R/T\text{-}m}$ denotes the amplitude and/or phase RSSI value(s) measured at reader and/or RFID tag side(s), and $RSSI_{th}$ denotes the threshold(s) determined, as previously explained, in the preliminary calibration step based on the average RSSI values $RSSI_{T\text{-}av}$, $RSSI_{R\text{-}av}$.

Conveniently, the threshold(s) $RSSI_{th}$ can be also modified dynamically and in real time so as to adapt the detection to a particular installation and/or environment (e.g., by adding an offset value for improving detection robustness/reliability).

Figure 6:
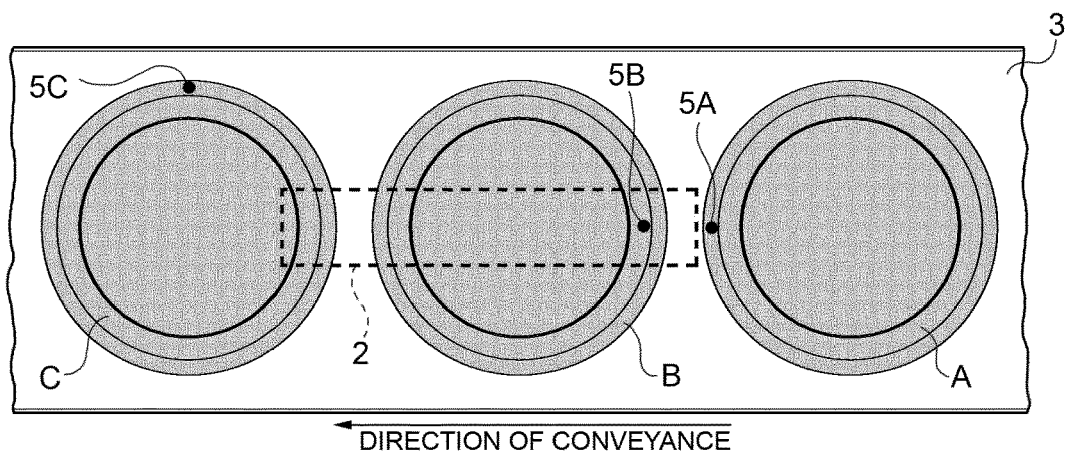
FIG. 6 schematically illustrates an example of detection of a sequence of three tires passing the RFID gate of FIG. 1.
Figure 6:
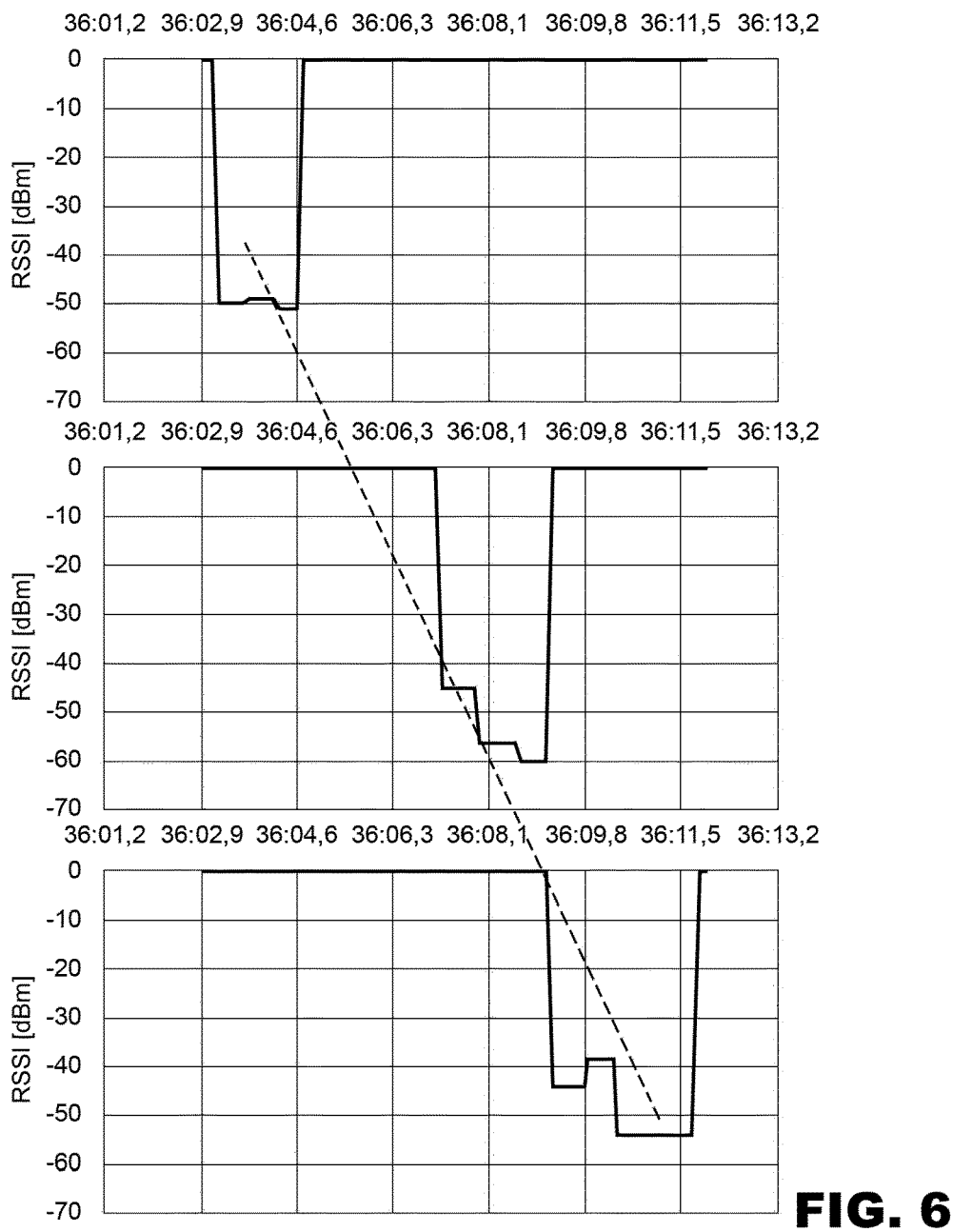

Conveniently, a proper processing of time variation of the value(s) $RSSI_{R/T\text{-}m}$ allows also to monitor/track the sequence of passing tires, as shown in FIG. 6, which schematically illustrates:
- at the top, a sequence of three passing tires A, B, C, each fitted with a respective RFID tag 5A/5B/5C; and,
- at the bottom, corresponding RSSI values measured over time (assuming that the tires A, B, C move with a speed of 1 m/s and are spaced apart by 100 cm, and that a reading power of 30 dBm is used).

From the foregoing, the technical advantages and the innovative features of the present invention are immediately clear to those skilled in the art.

In particular, it is important to point out that the present invention provides, in general, excellent RFID-based reading/writing performance and, in particular, univocal detection of RFID tags with enhanced performance with respect to that of currently known solutions.

Therefore, the present invention is advantageously exploitable for automatic control, monitoring and tracking applications in (smart) tire manufacturing, sorting and disposal plants employing conveyor belts.

Moreover, the present invention allows realizing tire inventory databases that store significant data related to each produced tire and are accessible (e.g., via Internet) to relevant stakeholders (e.g., manufacturing operators, logistics operators, dealers, customers, etc.).

In conclusion, it is clear that numerous modifications and variants can be made to the present invention, all falling within the scope of the invention, as defined in the appended claims. In this connection, it is worth noting that, although the invention has been previously described with specific reference to an antenna arranged over a conveyor belt, the teachings of the present invention can be immediately applied, mutatis mutandis, to different spatial configurations/arrangements of the antenna with respect to the conveyor. For example, the antenna can be conveniently installed along a lateral edge of the conveyor belt, adjacent to, or in proximity of, said conveyor belt, extending perpendicularly to, or tilted with respect to, conveyor belt's plane (i.e., the aforesaid reference plane xy) and parallelly to the direction of conveyance. More in general, the antenna might be arranged nearby the conveyor belt, still having a radiation pattern such that to result in a footprint area covering a whole width of the conveyor belt perpendicularly to the conveyance direction and a limited length parallelly to said conveyance direction (conveniently, being planar and having a predefined length parallelly to the conveyance direction and a predefined width perpendicularly to said conveyance direction, with the predefined length being larger than said predefined width).

The invention claimed is:
1. A method for reading and/or writing data from/on radiofrequency identification tags of tires conveyed on a conveyor belt in a conveyance direction, wherein each tire is fitted with a respective radiofrequency identification tag storing a univocal identifier of said tire, the method comprising:
providing an antenna to radiate radiofrequency signals toward a footprint area on the conveyor belt, and to receive backscattered radiofrequency signals from said footprint area;
providing a reader connected to the antenna to operate the antenna in transmission and reception;
during a preliminary calibration stage, calibrating the reader by:
a1) placing a given tire fitted with a given radiofrequency identification tag on the conveyor belt and keeping said given tire immobile proximate the antenna;
a2) while the given tire is kept immobile proximate the antenna,
determining a minimum transmission power necessary to activate the given radiofrequency identification tag,
determining a calibration transmission power higher than said minimum transmission power, and
radiating, via the antenna, calibration radiofrequency signals with said calibration transmission power and receiving, via said antenna, backscattered calibration radiofrequency signals from the given radiofrequency identification tag;
a3) while continuing radiating the calibration radiofrequency signals and receiving the backscattered calibration radiofrequency signals, increasingly moving the given tire back and forth on the conveyor belt until the given radiofrequency identification tag stops responding;
a4) estimating a size of the footprint area parallelly to the conveyance direction based on the operation a3);
a5) measuring first received power levels of the calibration radiofrequency signals received by the given radiofrequency identification tag while the given tire is kept immobile proximate the antenna and while said given tire is moved back and forth, and second received power levels of the backscattered calibration radiofrequency signals received by the reader via the antenna while the given tire is kept immobile proximate the antenna and while said given tire is moved back and forth;
a6) repeating the operations a1)-a5) with different tires, thereby obtaining a plurality of calibration transmission powers related to the different tires, a plurality of estimated sizes of the footprint area related to the different tires, and a plurality of first and second received power levels related to the different tires; and
a7) computing
an average transmission power based on the calibration transmission powers obtained,
an average size of the footprint area based on all the estimated sizes obtained,
an interrogation rate based on the average size of the footprint area and a given conveyance speed of the conveyor belt,
average received power levels based on the first and second received power levels obtained, and
one or more thresholds based on the average received power levels;
during a reading and/or writing stage, operating the calibrated reader to:
b1) radiate, via the antenna, one or more interrogation radiofrequency signals with the average transmission power and with the interrogation rate computed in the preliminary calibration stage;
b2) receive, via the antenna, one or more backscattered interrogation radiofrequency signals from a radiofrequency identification tag of a tire passing through the footprint area, wherein said one or more backscattered interrogation radiofrequency signals carry the univocal identifier of the passing tire;
b3) measuring
one or more third received power levels of the one or more interrogation radiofrequency signals received by the radiofrequency identification tag of the passing tire, and
one or more fourth received power levels of the one or more backscattered interrogation radiofrequency signals received by the reader via the antenna;
b4) detect the passing tire by comparing the third and fourth received power levels with the one or more thresholds computed in the preliminary calibration stage; and
b5) identify the detected passing tire based on the univocal identifier carried by the one or more backscattered interrogation radiofrequency signals.

2. The method of claim 1, wherein the reading and/or writing stage includes operating the calibrated reader also to:
b6) read and/or write tire-related data from/to the radiofrequency identification tag of the passing tire.

3. The method of claim 1, wherein the footprint area based on a radiation pattern of the antenna covers:
a whole width of the conveyor belt perpendicular to the conveyance direction; and
a limited length parallel to said conveyance direction.

4. The method of claim 1, wherein the antenna is planar and parallel to the conveyor belt, and has a predefined length parallel to the conveyance direction and a predefined width perpendicular to said conveyance direction, wherein the predefined length is larger than the predefined width.

5. The method of claim 1, wherein the first, second, third and fourth received power levels are indicative of received power amplitude and phase measurements.

6. A system for reading and/or writing data from/on radiofrequency identification tags of tires conveyed on a conveyor belt in a conveyance direction, wherein each tire is fitted with a respective radiofrequency identification tag storing a univocal identifier of said tire, the system comprising:
an antenna installed proximate the conveyor belt and configured to radiate radiofrequency signals toward a footprint area on the conveyor belt, and to receive radiofrequency signals backscattered by radiofrequency identification tags of tires passing through said footprint area; and
a reader connected to the antenna and configured to operate the antenna in transmission and reception, wherein the reader is further configured during a preliminary calibration stage to:
- a1) while a given tire fitted with a given radiofrequency identification tag is on the conveyor belt and kept immobile proximate the antenna,
  - determine a minimum transmission power necessary to activate the given radiofrequency identification tag,
  - determine a calibration transmission power higher than said minimum transmission power, and
  - radiate, via the antenna, calibration radiofrequency signals with said calibration transmission power and receive, via said antenna, backscattered calibration radiofrequency signals from the given radiofrequency identification tag;
- a2) while continuing radiating the calibration radiofrequency signals and receiving the backscattered calibration radiofrequency signals, to increasingly move the given tire back and forth on the conveyor belt until the given radiofrequency identification tag stops responding;
- a3) estimate a size of the footprint area parallelly to the conveyance direction based on the operation a2);
- a4) measure
  - first received power levels of the calibration radiofrequency signals received by the given radiofrequency identification tag while the given tire is kept immobile proximate the antenna and while said given tire is moved back and forth, and
  - second received power levels of the backscattered calibration radiofrequency signals received by the reader via the antenna while the given tire is kept immobile proximate the antenna and while said given tire is moved back and forth;
- a5) repeat the operations a1)-a4) with different tires, thereby obtaining a plurality of calibration transmission powers related to the different tires, a plurality of estimated sizes of the footprint area related to the different tires, and a plurality of first and second received power levels related to the different tires; and
- a6) compute
  - an average transmission power based on the calibration transmission powers obtained,
  - an average size of the footprint area based on all the estimated sizes obtained,
  - an interrogation rate based on the average size of the footprint area and a given conveyance speed of the conveyor belt,
  - average received power levels based on the first and second received power levels obtained, and
  - one or more thresholds based on the average received power levels wherein the reader is further configured during a reading and/or writing stage to:
- b1) radiate, via the antenna, one or more interrogation radiofrequency signals with the average transmission power and with the interrogation rate computed in the preliminary calibration stage;
- b2) receive, via the antenna, one or more backscattered interrogation radiofrequency signals from a radiofrequency identification tag of a tire passing through the footprint area, wherein said one or more backscattered interrogation radiofrequency signals carry the univocal identifier of the passing tire;
- b3) measure
  - one or more third received power levels of the one or more interrogation radiofrequency signals received by the radiofrequency identification tag of the passing tire, and
  - one or more fourth received power levels of the one or more backscattered interrogation radiofrequency signals received by the reader via the antenna;
- b4) detect the passing tire by comparing the third and fourth received power levels with the one or more thresholds computed in the preliminary calibration stage; and
- b5) identify the detected passing tire based on the univocal identifier carried by the one or more backscattered interrogation radiofrequency signals.

7. The system of claim 6, wherein the antenna is configured to have a radiation pattern such that the footprint area covers:
- a whole width of the conveyor belt perpendicular to the conveyance direction; and
- a limited length parallel to said conveyance direction.

8. The system of claim 6, wherein the antenna is planar and parallel to the conveyor belt, and has a predefined length parallel to the conveyance direction and a predefined width perpendicular to said conveyance direction, wherein the predefined length is larger than the predefined width.

9. The system of claim 6, comprising a plurality of antennas that are:
- installed in different positions along the conveyor belt;
- each configured to radiate radiofrequency signals toward, and receive backscattered radiofrequency signals from, a respective footprint area on the conveyor belt; and
- connected to the reader to be operated in transmission and reception;
- wherein a position of each detected tire is determined by the reader, based on the antenna that has received the one or more backscattered interrogation radiofrequency signals based on which said tire has been detected.

10. The system of claim 6, comprising a plurality of antennas that are:
- installed in different positions along the conveyor belt;
- each configured to radiate radiofrequency signals toward, and receive backscattered radiofrequency signals from, a respective footprint area on the conveyor belt; and
- connected to the reader to be operated in transmission and reception;
- wherein a position of each detected tire is determined, by an electronic control unit operably connected to the reader, based on the antenna that has received the one or more backscattered interrogation radiofrequency signals based on which said tire has been detected.

11. The system of claim 6, comprising a plurality of antennas that are:
- installed in different positions along the conveyor belt;
- each configured to radiate radiofrequency signals toward, and receive backscattered radiofrequency signals from, a respective footprint area on the conveyor belt; and
- connected to the reader to be operated in transmission and reception;
- wherein a position of each detected tire is determined, by an electronic control unit integrated in the reader, based on the antenna that has received the one or more backscattered interrogation radiofrequency signals based on which said tire has been detected.

* * * * *